June 9, 1936.    F. C. BEST    2,043,228
MOTOR VEHICLE
Filed Feb. 27, 1933    2 Sheets-Sheet 1

Inventor
Frank C. Best,
By Watson, Coit, Moss & Grindle,
Attorney

June 9, 1936.  F. C. BEST  2,043,228
MOTOR VEHICLE
Filed Feb. 27, 1933  2 Sheets-Sheet 2
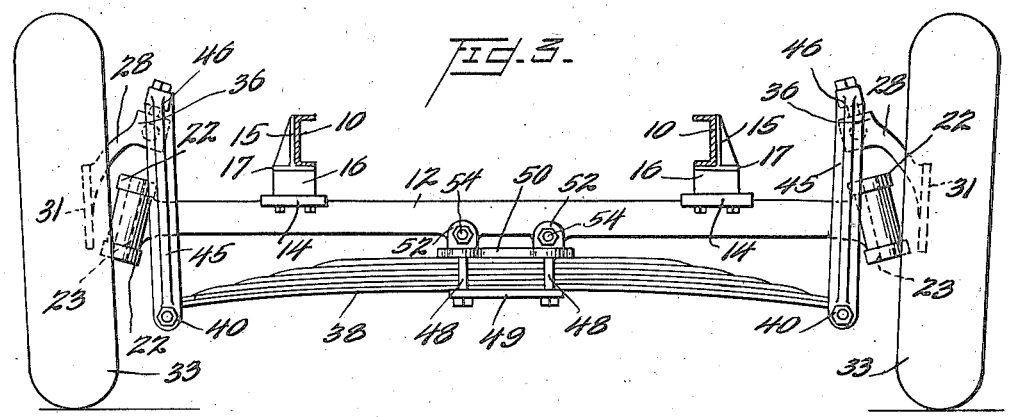
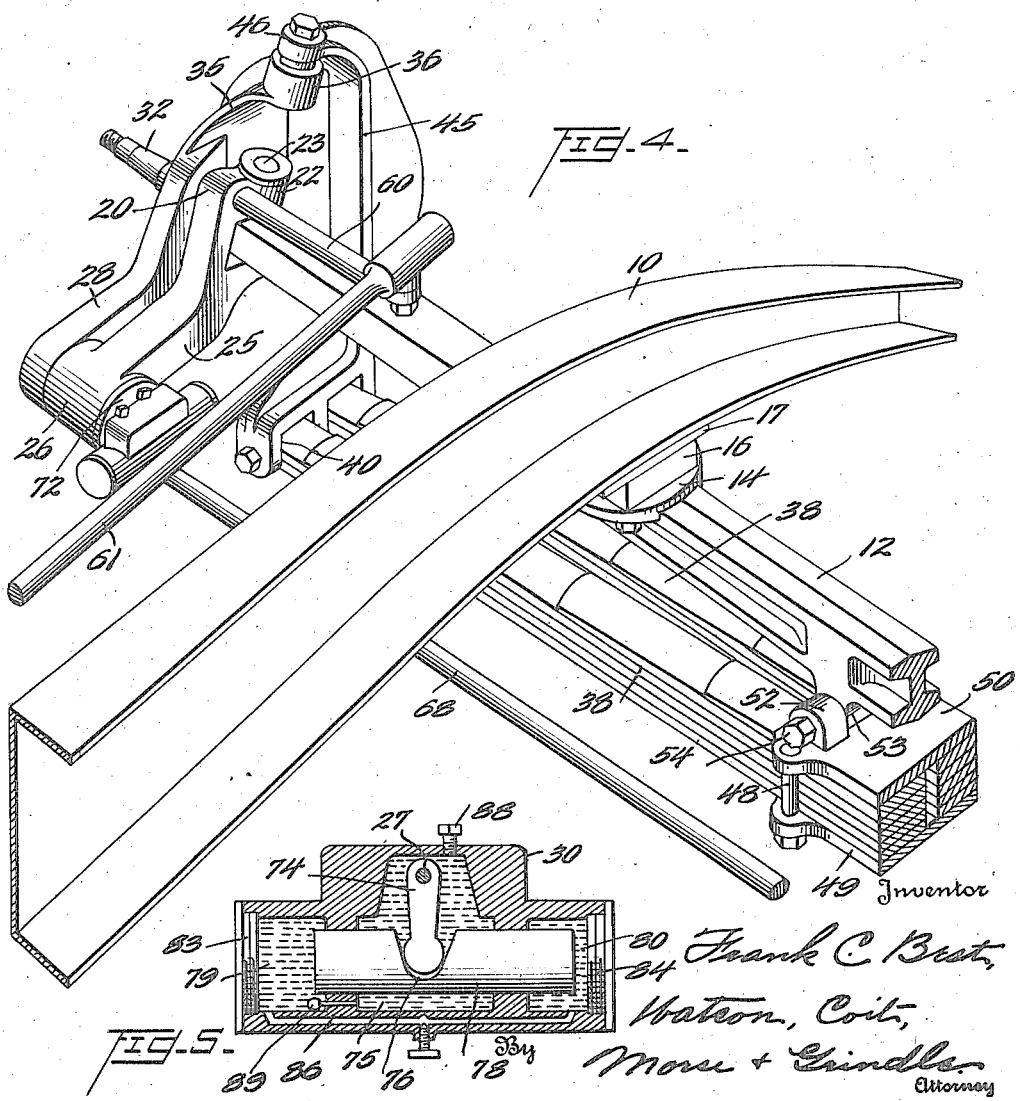

Patented June 9, 1936

2,043,228

UNITED STATES PATENT OFFICE 2,043,228

MOTOR VEHICLE

Frank C. Best, Detroit, Mich., assignor to Packard Motor Car Company, Detroit, Mich., a corporation of Michigan Application February 27, 1933, Serial No. 658,866

17 Claims. (Cl. 280—96.2)

This invention relates to motor vehicle suspension and steering mechanism and is particularly concerned with constructions in which the steerable road wheels of the vehicle are independently sprung.

It is the principal object of the invention to provide an arrangement whereby the mechanism for imparting steering movement to the road wheels may be carried by the vehicle frame, the wheels being sprung independently of this mechanism, so that relative movement of the road wheels and the frame such as occurs on driving over an uneven road bed is not communicated to the steering apparatus. It is a feature of the invention that the usual steering knuckle or the equivalent thereof is carried on the vehicle frame and thus partakes of no movement with respect to the frame other than the usual swinging movement in a substantially horizontal plane for steering purposes.

It is a further object of the invention to provide a construction of this character yielding means, acting between the frame and the steerable road wheel assembly, for resisting vertical movement of the latter, this yielding means being preferably of the leaf spring type.

A further feature of the invention is the provision of means for connecting the leaf spring or its equivalent to the wheel assembly at a point located substantially in the axis of the steering knuckle to prevent communication of movement to the spring when the road wheels are swung for steering purposes about the knuckle axis.

A more specific object of the invention is the provision of a steering knuckle carried by the vehicle frame, an arm supporting the road wheel assembly and pivotally connected to the steering knuckle for substantially vertical movement with respect thereto, shock absorbing means acting between the arm and the steering knuckle at the point of pivotal connection thereof, and yielding means carried by the frame and engaging the wheel supporting arm to resist vertical movement of the wheel assembly. This construction permits of the use of a dead axle serving to connect the usual side frame members of the vehicle frame and constituting a support for the steering knuckles, and a leaf spring extending transversely across the frame and carried by the axle, the opposite ends of the leaf spring being connected to the respective road wheel assemblies to independently and yieldingly support the latter.

Further objects and features of the invention will be apparent from the following description taken in connection with the accompanying drawings, in which Figure 1 is a plan view of a portion of an automobile chassis illustrating one embodiment of the present invention;

Figure 3 is a front elevation;

Figure 4 is a perspective view of a portion of the spring suspension and associated steering mechanism; and Figure 5 is a sectional view representing a simple form of shock absorber for the suspension.

Figure 1:
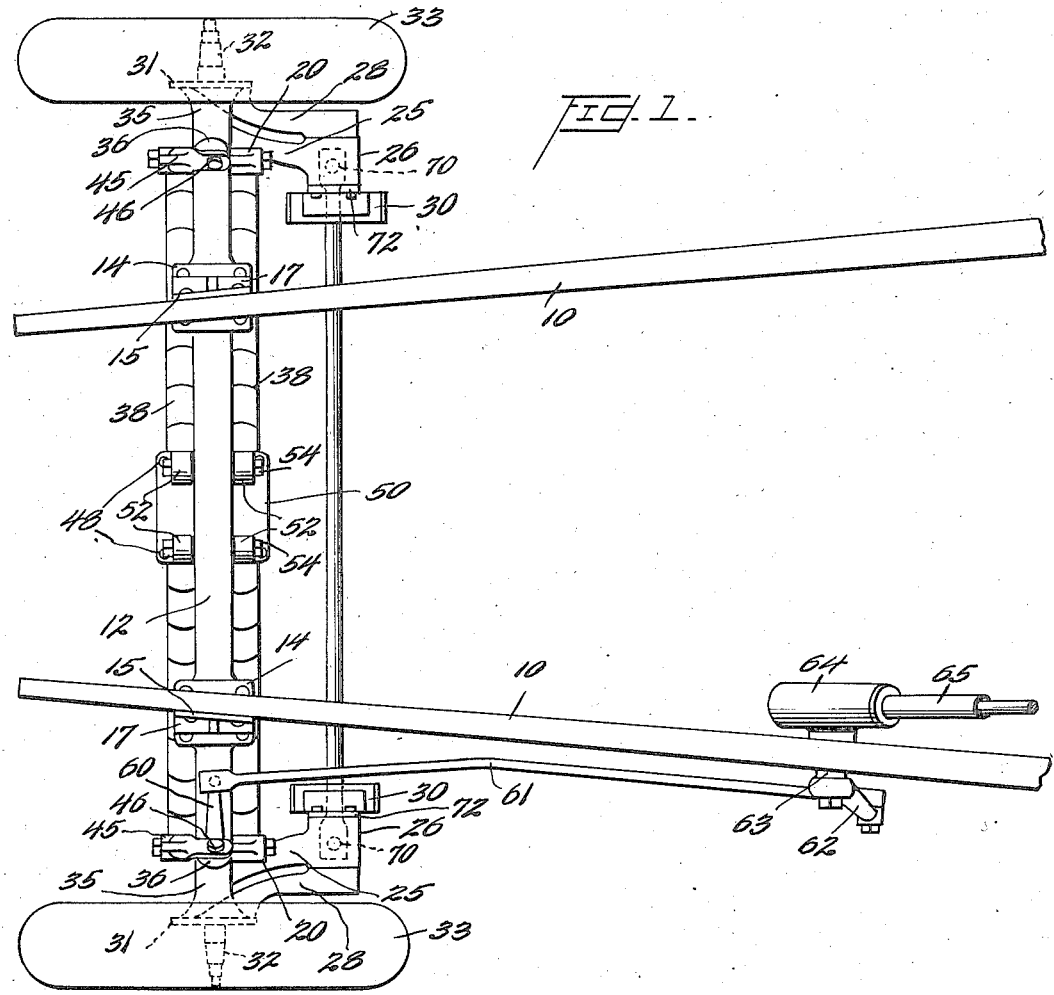
Figure 2:
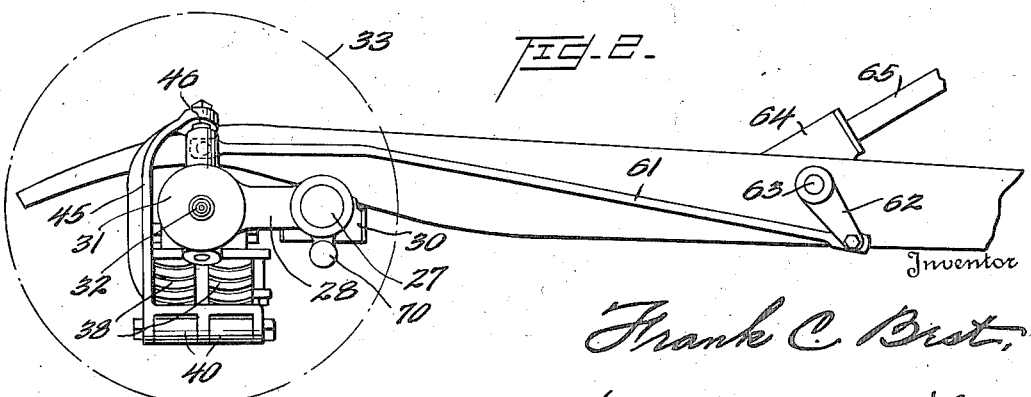
Figure 2 is a side elevation of the arrangement shown in Figure 1.

While specific language is used herein in describing the construction selected for the purpose of illustration in order that the invention may be more readily understood, it will be appreciated that no limitation of the invention is thereby intended and that various alterations and modifications are contemplated such as fall within the spirit and scope of the claims appended hereto.

Referring to the drawings in which the various elements are designated by reference numerals, it will be noted that the vehicle to which the invention is applied includes a vehicle frame comprising the side frame members 10 and an axle 12, the axle having little or no relative movement with respect to the frame and preferably serving as a cross frame member to tie the side frame members 10 together. Connection between the side frame members 10 and the axle 12 may be effected by bolting or otherwise securing these members directly together at either side of the vehicle, but preferably a yielding or deformable means permitting slight relative movement of the axle and the side frame members is provided. For instance, a plate 14 may be rigidly secured to the axle 12 and a supporting bracket 15 may be bolted to the frame member 10, a block 16 of rubber or other imperfectly elastic material being interposed between the plate 14 and the base portion 17 of the bracket 15, and being secured to both in any convenient manner, for instance by vulcanization. This construction not only serves to deaden shocks which would otherwise be transmitted from the axle to the frame, but is a compromise between a three point suspension and a four point suspension, preventing to some extent the transmission of forces from the axle to the frame which would result in twisting or weaving of the latter and at the same time ensuring reasonable stability of the frame on the axle.

Each end of the axle 12 affords a support for a steering knuckle 20, it being observed that the term "steering knuckle" is used for convenience and is intended to cover any device or member supported for movement in a horizontal or nearly horizontal plane and adapted to carry a road wheel, so that the vehicle may be steered by movement of the knuckle. Thus in the arrangement shown in the drawings each knuckle 20 may be provided with forked arms 22 adapted to receive a king pin 23, the latter being supported adjacent the end of the axle 12, for instance the pin may pass through the axle and be rigidly secured therein, it being observed that the usual caster effect may be obtained by canting the pin.

Reference will now be made to the arrangement applied at the left hand side of the vehicle since the construction at the right side of the vehicle is similar with one exception hereinafter pointed out.

The steering knuckle 20 is extended rearwardly as shown in Figure 4 of the drawings to provide an arm 25 terminating in a boss 26, and an arm 28 which serves to support the road wheel assembly and which in effect forms a part thereof is pivotally connected to the boss 26 for swinging movement in a substantially vertical plane. For instance, the arm 28 may be provided at its rearward end with a spindle 27 journalled in the boss 26 and extending therethrough for cooperation with shock absorbing means within a casing 30, more particularly described hereinafter.

At a point approximately opposite the point of pivotal support of the knuckle 20 on the axis 12, the arm 28 merges into a substantially annular plate 31 which may support the usual brake backing plate of the wheel assembly, and a wheel spindle 32 formed integrally with or secured to the plate 31 projects laterally and serves to journal the vehicle road wheel 33 in the conventional manner. The arm 28 and plate 31 are preferably extended upwardly by an integrally formed arm 35, the upper end of which is provided with a boss 36.

One or more leaf springs 38, two being shown in the drawings, are carried by the vehicle frame in a manner hereinafter described and the outer ends of these springs are pivotally connected in the conventional manner, as indicated at 40, to a link 45 which is in turn provided at its upper end with an articulated connection 46 to the arm 28. The link 45 is preferably provided either at its point of connection with the springs 38 or with the arm 28 with a joint of the universal type, and in the arrangement shown in the drawings this universal connection is afforded at the upper end of the link, for instance by the provision of a ball rotatable within a corresponding socket in the boss 36. This ball joint may be of any conventional construction and may be provided with anti-friction devices such as roller bearings so that the link 45 is permitted a slight swinging movement in any direction with respect to the arm 28 which carries the road wheel.

Returning to the springs 38, it will be observed that these extend transversely across the vehicle frame and are secured adjacent the center line of the vehicle to the axle 12. If desired, the springs may be bolted directly to the axle, but preferably some deformable means such as one or more rubber blocks, are interposed between the springs and the axle to permit a slight amount of relative movement thereof. Thus the springs may be clamped by means of bolts 48 between the plates 49 and 50. Secured to the plate 50, for instance by being embedded in recesses therein, are a plurality of deformable blocks 52, for instance of rubber, two of these blocks being shown on each side of the axle. The blocks 52 may be apertured to permit the passage therethrough of bolts 54 which extend through suitable apertures in bosses 53 on the axle. It will thus be observed that the load on the axle is carried through the rubber blocks 52 and thus transmitted to the leaf springs 38 which are in turn connected through the links 45 with the wheel carrier arms 28.

The parts are so designed that with normal loading of the vehicle, the point of connection between the link 45 and the arm 28 which supports the wheel lies substantially in the axis of the steering knuckle 20. A steering lever 60 is rigidly secured to the knuckle 20 and extends inwardly therefrom, this lever having an articulated connection at its inner end with a drag link 61. The drag link 61 extends fore and aft of the vehicle and is connected in the conventional manner with an arm 62 which is secured to a shaft 63 extending through the side frame member 10 and actuated by gearing (not shown) within the housing 64, the latter being located at the lower end of the steering column 65 as is customary.

It will now be apparent that when the shaft 63 and lever 62 are rocked in response to manipulation of the usual steering hand wheel, the drag link will be shifted forwardly or rearwardly and, by means of the steering lever 60, the steering knuckle 20 will be swung in a substantially horizontal plane on the axle 12 for steering the vehicle. This swinging movement of the knuckle 20 is imparted to the arm 28 which carries the wheel assembly, and by reason of the fact that the point of pivotal connection between the link 45 and the wheel carrier arm 28 lies substantially in the axis of swinging movement of the knuckle 20, the link 45 will not be displaced to any material extent during steering of the vehicle.

When an obstruction is encountered by the road wheel or when the vehicle is driven over uneven ground, the wheel assembly will swing upwardly about the point of pivotal connection between the arm 28 and the arm 25 which is carried by the knuckle, and this vertical or substantially vertical movement of the wheel assembly is resisted by the leaf springs 38 acting through the link 45. Such movement of the road wheel assembly does not, however, affect the steering mechanism, all parts of which are carried on the frame and thus partake of no relative movement in response to vertical movement of the road wheel.

The usual steering tie rod 68 is provided to connect the steering knuckles 20 at opposite sides of the vehicle for simultaneous movement, this tie rod being pivotally connected to both steering knuckles, for instance at the lower side of each boss 26 as indicated at 70. It will be understood that the construction on the right hand side of the vehicle is identical with that on the left hand side with the exception that the drag link 61 and the steering lever 60 are omitted on that side of the vehicle which is remote from the steering mechanism.

Returning now to the shock absorber 30 and referring more particularly to Figure 5 of the drawings, it will be observed that the moving parts are completely encased, the casing being preferably provided with a flanged portion 72 apertured to receive bolts for attachment to the inner side of the boss 26 of the steering knuckle 20. As hereinbefore explained, the spindle 27 which passes through the boss 26 and to which the wheel supporting arm 28 is secured, extends into the shock absorber casing and is provided with an arm 74, rigidly secured to the spindle and depending within the main chamber 75 of the shock absorber. The lower end of the arm 74 engages a recess 76 in a double piston 78, the latter working in cylinders 79 and 80 formed at opposite ends of the absorber casing, these cylinders being preferably closed by elements 83 and 84 which are threaded into the respective ends of the casing.

The cylinders 79 and 80 are placed in communication by a passage 86, and it will be observed that on reciprocation of the double piston 78, fluid contained within the cylinders 79 and 80 will be caused to flow back and forth through the communicating passage 86. Such flow is resisted by suitably restricting the passage, for instance a regulating device consisting of a screw threaded element arranged to block the passage to a greater or less extent may be employed.

The shock absorber casing including the chamber 75 is supplied with oil or similar fluid, a filler opening and plug 88 being provided for this purpose.

The fluid within the chamber 75 acts as a source of supply for the communicating system including the cylinders 79 and 80 and the passage 86, a one-way valve 89 communicating with the cylinder 79 and the chamber 75 being provided to permit flow of fluid from the chamber into the cylinder only so that the supply of oil in the cylinders is automatically replenished from time to time.

It is obvious that the specific construction of this shock absorber forms no part of the present invention and that any conventional type of shock absorber may be readily applied to the construction shown in the drawings for the purpose of resisting sudden relative movement of the road wheel assembly and the steering knuckle and vehicle frame.

The various advantages of the present invention will be apparent from the foregoing description. In addition to those which have been mentioned, it will be observed that the total unsprung weight is unusually low, with the result that the riding qualities of the vehicle are improved and the life of the vehicle tires are prolonged. The transmission of vibrations to the vehicle frame is materially reduced by reason of the reduction of the unsprung weight and the tendency of the vehicle to pitch fore and aft on sudden application of the brakes is substantially eliminated as the result of the novel method of yieldably connecting the frame and wheel assembly.

It will also be observed that the springs are loaded in the vertical direction only, no torsional strain being applied under any conditions of operation, and that the springs are not used to tie parts of the vehicle together but function solely to yieldingly support the frame. Thus the springs are less likely to break and breakage of one or more springs has little effect on the normal functioning of the remaining vehicle parts, it being significant that the relationship of the remaining elements of the steering mechanism is not disturbed on breakage of a spring thereby reducing the possibility of accident from this source.

Furthermore, by reason of the manner in which the road wheel is supported, there is no canting of the wheel when an obstruction is encountered at one side of the vehicle and thus the tread is not altered. This reduces the tendency of the vehicle to turn to one side or the other when passing over an uneven road bed.

Having thus described the invention, what is claimed as new and desired to be secured by Letters Patent is:

1. In a motor vehicle, the combination with a vehicle frame, of a steerable road wheel, a steering knuckle carried by said frame, means supporting said wheel on said knuckle for steering movement therewith and for swinging movement in a substantially vertical plane with respect thereto, and a leaf spring assembly independent of said supporting means, carried by said frame and associated with said wheel supporting means for resisting vertical movement of the wheel.

2. In a motor vehicle, the combination with a vehicle frame, of a steerable road wheel, a steering knuckle carried by said frame, means supporting said wheel on said knuckle for steering movement therewith and for swinging movement in a substantially vertical plane with respect thereto, and yielding means independent of said supporting means, acting between said frame and said wheel for resisting vertical movement of said wheel.

3. In a motor vehicle, the combination with a vehicle frame, of a steerable road wheel assembly, means supporting said wheel assembly for substantially horizontal swinging movement on said frame for steering and substantially vertical swinging movement with respect to said frame in response to road shock, and yielding means acting between said frame and said wheel assembly and connected to the latter substantially at the axis of steering movement for resisting vertical movement of said wheel.

4. In an independently sprung wheel suspension for motor vehicles, the combination with a vehicle frame, of a steerable road wheel assembly, means supporting said wheel assembly for substantially horizontal swinging movement on said frame for steering and substantially vertical swinging movement with respect to said frame in response to road shock, and yielding means for resisting vertical movement of said wheel assembly, said yielding means being connected to said wheel assembly substantially at the axis of steering movement of said wheel.

5. In an independently sprung wheel suspension for motor vehicles, the combination with a vehicle frame, of a steerable road wheel assembly, means supporting said wheel assembly for substantially horizontal swinging movement on said frame for steering and substantially vertical swinging movement with respect to said frame in response to road shock, and yielding means for resisting vertical movement of said wheel assembly, said yielding means comprising a leaf spring connected to said frame and to said wheel assembly substantially in the axis of swinging movement of the latter.

6. In a motor vehicle, the combination with a vehicle frame, of a steering knuckle carried by said frame, a steerable road wheel assembly supported on said knuckle for relative movement with respect thereto in a substantially vertical plane, yielding means acting between said frame and said road wheel assembly for resisting vertical movement of the latter, and a shock absorbing device interposed between said knuckle and said wheel assembly for resisting sudden relative movement thereof.

7. In a motor vehicle, the combination with a vehicle frame, of a steering knuckle carried by said frame, a steerable road wheel assembly supported on said knuckle for relative movement with respect thereto in a substantially vertical plane, a leaf spring assembly carried by said frame and connected with said road wheel assembly for resisting vertical movement of the latter, and a shock absorbing device interposed between said knuckle and said wheel assembly for resisting sudden relative movement thereof.

8. In a motor vehicle, the combination with a vehicle frame, of a steering knuckle carried by said frame, a steerable road wheel assembly supported on said knuckle for relative movement with respect thereto in a substantially vertical plane, yielding means acting between said frame and said road wheel assembly for resisting vertical movement of the latter, said yielding means being connected with said wheel assembly substantially in the axis of said steering knuckle, and a shock absorbing device interposed between said knuckle and said wheel assembly for resisting sudden relative movement thereof.

9. In a motor vehicle, the combination with a vehicle frame, of a steering knuckle carried by said frame, a road wheel, means supporting said road wheel and pivotally connected with said knuckle for movement with respect thereto in a substantially vertical plane, and yielding means carried by said frame and engaging said first named means for resisting such relative movement.

10. In a motor vehicle, the combination with a vehicle frame, of a steering knuckle carried by said frame, a road wheel, means supporting said road wheel and pivotally connected with said knuckle for movement with respect thereto in a substantially vertical plane, yielding means carried by said frame and engaging said first named means for resisting such relative movement, and a shock absorbing device acting between said first named means and said knuckle at the point of pivotal connection therebetween to resist sudden relative movement thereof.

11. In a motor vehicle, the combination with a vehicle frame, of a steering knuckle carried by said frame, a road wheel, means supporting said road wheel and pivotally connected with said knuckle for movement with respect thereto in a substantially vertical plane, and yielding means carried by said frame and engaging said first named means for resisting such relative movement, said yielding means comprising a leaf spring, and a link having articulated connections with said spring and with said first named means substantially in the knuckle axis.

12. In a motor vehicle, the combination with a vehicle frame, of a steering knuckle carried by said frame, a road wheel, means supporting said road wheel and pivotally connected with said knuckle for movement with respect thereto in a substantially vertical plane, and yielding means carried by said frame and engaging said first named means for resisting such relative movement, said yielding means comprising a leaf spring, and a link having articulated connections with said spring and with said first named means substantially in the knuckle axis, one of said articulated connections being of the universal joint type.

13. In a motor vehicle, the combination with a vehicle frame, of a steering knuckle carried by said frame, an arm rigid with said knuckle, a road wheel, an arm supporting said road wheel, a pivotal connection between said arms, a shock absorbing device associated with said pivotal connection for resisting sudden relative movement of said arms, and yielding means carried by said frame and connected with said first mentioned arm to resist vertical movement of the latter with respect to the frame.

14. In a motor vehicle, the combination with a vehicle frame, of a steering knuckle carried by said frame, an arm rigid with said knuckle, a road wheel, an arm supporting said road wheel, a pivotal connection between said arms, a shock absorbing device associated with said pivotal connection for resisting sudden relative movement of said arms, and yielding means carried by said frame and connected with said first mentioned arm to resist vertical movement of the latter with respect to the frame, said yielding means comprising a leaf spring, and a link pivoted to said spring and to said wheel supporting arm substantially in the axis of said knuckle.

15. In a motor vehicle, the combination with a vehicle frame, of a steering knuckle carried by said frame, an arm rigid with said knuckle, a road wheel, an arm supporting said road wheel, a pivotal connection between said arms, a shock absorbing device associated with said pivotal connection for resisting sudden relative movement of said arms, and yielding means carried by said frame and connected with said first mentioned arm to resist vertical movement of the latter with respect to the frame, said yielding means comprising a leaf spring, a link pivoted to said spring and to said wheel supporting arm substantially in the axis of said knuckle, and deformable means connecting said spring with said frame.

16. In a motor vehicle, the combination with a vehicle frame, of a pair of steerable road wheels located at opposite sides of said frame, steering knuckles carried by said frame, means supporting said wheels on said knuckles for swinging steering movement therewith and for substantially vertical movement with respect thereto, a leaf spring assembly extending transversely across said frame and carried thereby, and means for connecting the opposite ends of said spring assembly with said road wheels to resist vertical movement of the latter.

17. In a motor vehicle, the combination with a vehicle frame, of a pair of steerable road wheels located at opposite sides of said frame, steering knuckles carried by said frame, means supporting said wheels on said knuckles for swinging steering movement therewith and for substantially vertical movement with respect thereto, a leaf spring assembly extending transversely across said frame and carried thereby, and means for connecting the opposite ends of said spring assembly with said road wheels to resist vertical movement of the latter, said last named means comprising a pivoted link connected with said wheel substantially in the axis of said steering knuckle.

FRANK C. BEST.